(12) United States Patent
Itou et al.

(10) Patent No.: US 7,319,567 B2
(45) Date of Patent: Jan. 15, 2008

(54) SERVO SECTOR IN MAGNETIC DISK DRIVE

(75) Inventors: Kiyotada Itou, Kanagawa (JP); Yoshio Soyama, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 219 days.

(21) Appl. No.: 11/202,583

(22) Filed: Aug. 11, 2005

(65) Prior Publication Data

US 2006/0039076 A1 Feb. 23, 2006

(30) Foreign Application Priority Data

Aug. 23, 2004 (JP) .............................. 2004-241975

(51) Int. Cl.
*G11B 5/596* (2006.01)
(52) U.S. Cl. ..................... 360/39; 360/61; 360/77.08
(58) Field of Classification Search ................. None
See application file for complete search history.

(56) References Cited

U.S. PATENT DOCUMENTS 5,589,998 A * 12/1996 Yu ......................... 360/78.14
5,903,410 A    5/1999 Blaum et al.
6,288,861 B1   9/2001 Blaum et al.
6,934,114 B1 *  8/2005 Codilian et al. ......... 360/77.08
7,116,505 B1 * 10/2006 Kupferman .................. 360/48

FOREIGN PATENT DOCUMENTS

JP         06-243590       9/1994

* cited by examiner

*Primary Examiner*—Andrea Wellington
*Assistant Examiner*—Varsha A. Kapadia
(74) *Attorney, Agent, or Firm*—Townsend and Townsend and Crew LLP; Patrick Duncan

(57) ABSTRACT

Embodiments of the invention lower the servo sector's share of each track and ensure that servo sector numbers are reliably determined. According to the embodiment, in the servo sector number (SSA) section of each servo sector, servo sector number information whose bit length (k bits) is shorter than the bit length required to express the servo sector number itself is preliminarily written. The servo sector number of each servo sector is determined by using the servo sector number information in m successive servo sectors, that is, a total of m×k bits of information. Note that they satisfy the $m(2^{m \times k}-1) \leq N$ relation where N denotes the total number of servo sectors per track.

9 Claims, 5 Drawing Sheets (k, m) = (3, 2)

(k, m) = (3, 2)

Step.1:
Express Nidx in m*k bits.

Step.2:
Assign segment j of Nidx to the Secondary pattern of the (m*Nidx-j)th servo sector (j=1, 2, ---, m). There are m different patterns and one of them is assigned according to j.

Fig.8

Case: Even, (k, m)=(3,2)

Step.1:
If the servo sector is even, the Primary pattern is 0.
In this case, set the Secondary pattern to the higher three bits of the Nidx and the Secondary pattern in the preceding odd sector to the lower three bits of the Nidx. Further, change the lower three bits as below:
1) If the lower three bits are 111, change them to 000.
2) If the lower three bits are not 111, add 1 to them.
Based on the resulting 6-bit information, determine the Nidx.

| Servo Sector No. | Secondary Pattern | Primary Pattern | upper 3bit | lower 3bit | upper 3bit | modified lower 3bit | $N_{idx}$ |
|---|---|---|---|---|---|---|---|
| 1 | 0 0 1 | 1 | | | | | |
| 2 | 0 0 0 | 0 | 0 0 0 | 0 0 1 | → 0 0 0 | 0 1 0 | → 2 |
| 3 | 0 1 0 | 1 | | | | | |
| 4 | 0 0 0 | 0 | 0 0 0 | 0 1 0 | → 0 0 0 | 0 1 1 | → 3 |
| 5 | 0 1 1 | 1 | | | | | |
| 6 | 0 0 0 | 0 | 0 0 0 | 0 1 1 | → 0 0 0 | 1 0 0 | → 4 |
| 7 | 1 0 0 | 1 | | | | | |
| 8 | 0 0 0 | 0 | 0 0 0 | 1 0 0 | → 0 0 0 | 1 0 1 | → 5 |
| 9 | 1 0 1 | 1 | | | | | |
| 10 | 0 0 0 | 0 | 0 0 0 | 1 0 1 | → 0 0 0 | 1 1 0 | → 6 |
| 11 | 1 1 0 | 1 | | | | | |
| 12 | 0 0 0 | 0 | 0 0 0 | 1 1 0 | → 0 0 0 | 1 1 1 | → 7 |
| 13 | 1 1 1 | 1 | | | | | |
| 14 | 0 0 1 | 0 | 0 0 1 | 1 1 1 | → 0 0 1 | 0 0 0 | → 8 |
| 15 | 0 0 0 | 1 | | | | | |
| 16 | 0 0 1 | 0 | 0 0 1 | 0 0 0 | → 0 0 1 | 0 0 1 | → 9 |
| 17 | 0 0 0 | 1 | | | | | |
| ⋮ | ⋮ | | ⋮ | | ⋮ | | ⋮ |

Step.2:
Determine the servo sector number as 2(Nidx−1) from the decoded Nidx.

SERVO SECTOR IN MAGNETIC DISK DRIVE

CROSS-REFERENCES TO RELATED APPLICATIONS

This application claims priority from Japanese Patent Application No. JP2004-241975, filed Aug. 23, 2004, the entire disclosure of which is incorporated herein by reference.

BACKGROUND OF THE INVENTION

The present invention relates to magnetic disk drives. In particular, the invention relates to a magnetic disk drive which supports servo sectors each having a servo sector number section in which servo sector number information, shorter than the bits required to express the servo sector number itself, is written.

Recently, due to the demand for larger capacity magnetic disk drives, it has become necessary to raise the data space's share of the disk format as well as to raise TPI (Track Per Inch) and BPI (Bits Per Inch). On a disk, there are a large number of concentric tracks each having data sectors for user information and servo sectors for servo information used to locate the head to the track.

As described in Patent Document 1 (U.S. Pat. No. 5,903,410) and Patent Document 2 (Japanese Patent Laid-Open No. 6-243590), a typical magnetic disk drive nowadays employs such a format that from each data sector, the conventional ID section containing information to determine the logical address of the data sector is omitted so as to raise the data sector's share. In the format described in Patent Document 3 (U.S. Pat. No. 6,288,861), the servo sector number section is omitted from the servo sector so as to further reduce the servo sector's share.

BRIEF SUMMARY OF THE INVENTION

In such an ID section-less format as described in Patent Document 1 and Patent Document 2, it is necessary to determine the physical address of each servo sector since the logical address of each data sector is obtained by translation from the head number, track number and servo sector number. In addition, the physical address of each servo sector must precisely be determined since the physical address is used in the magnetic head servo control to set the phase of compensation for the vibration components synchronized with the revolution.

If each servo sector has a servo sector number indicative of the physical address written therein, the physical address of each servo sector can be determined by reading it when the servo sector is decoded. However, the space for the servo sector numbers decrease the space for the data sectors. According to Patent Document 2, no servo sector number section is included but an index section is embedded on each track to indicate the start of the track. A counter counts up the number of servo sectors which have passed, making it possible to determine the servo sector number of each servo sector. However, if the index section is missed, rotational latency occurs causing a problem of bad error recovery performance. Another problem with this method is that the possibility of improper index recognition lowers the reliability of servo sector numbers determined.

Also, according to Patent Document 3, no servo sector number section is included. A servo sector number determining pattern is constituted for a servo sector by using the servo address marks in several successive sectors. The servo sector is identified according to its pattern matching with one of several different reference patterns that are previously defined. However, this method involves a problem in that the identification reliability is subject to the servo address marks which may wrongly be detected. In addition, this method is disadvantageous in that the quantity of memory consumed to store the reference patterns and the time required to make a pattern matching judgment on each reference pattern are operationally undesirable.

It is a feature of the present invention to provide a magnetic disk drive capable of lowering the servo sector's share of each track and raising the reliability of determining the servo sector number of each servo sector.

A magnetic disk drive according to an aspect of the present invention is characterized in that each servo sector number section has servo sector number information whose bit length is shorter than the bits required to express the servo sector number itself. Since a servo sector number itself is not written in each servo sector number section, it is possible to lower the servo sector's share. In addition, since the servo sector number of each servo sector is decoded based on information in servo sector number sections, each servo sector can be identified reliably.

According to the present invention, k-bit servo sector number information is preliminarily written in the servo sector number section of each servo sector and the servo sector number of each servo sector is determined by using the servo sector number information in m successive servo sectors, that is, a total of m×k bits of information. Note that they satisfy the $m(2^{m \times k}-1) \leq N$ relation where N denotes the total number of servo sectors per track. In each servo sector number section, a segment resulting from dividing from dividing the bit sequence expressing the servo sector number itself into m segments is set as servo sector number information. In addition, the magnetic disk drive includes a mechanism for storing the servo sector number information retrieved m successive servo sectors and a mechanism for determining the servo sector number of a servo sector from the stored information. The servo sector number determination mechanism comprises m different servo sector number determinators and each servo sector number determinators determines the servo sector number of a servo sector by appropriately rearranging m segments and correcting the result. In addition, the magnetic disk drive includes a module for selecting one of the m different servo sector number identifiers by using additional information or the like contained in the servo sector number section.

The present invention allows more efficient data formatting than those involving writing servo sector numbers themselves. In addition, since a servo sector number is determined based on the servo sector number information in each servo sector, the determined servo sector number is highly reliable.

BRIEF DESCRIPTION OF THE DRAWINGS

FIG. 8 shows how an even servo sector is identified by the servo sector number determination device in the magnetic disk drive according to the embodiment of the present invention.

DETAILED DESCRIPTION OF THE INVENTION

Figure 1:
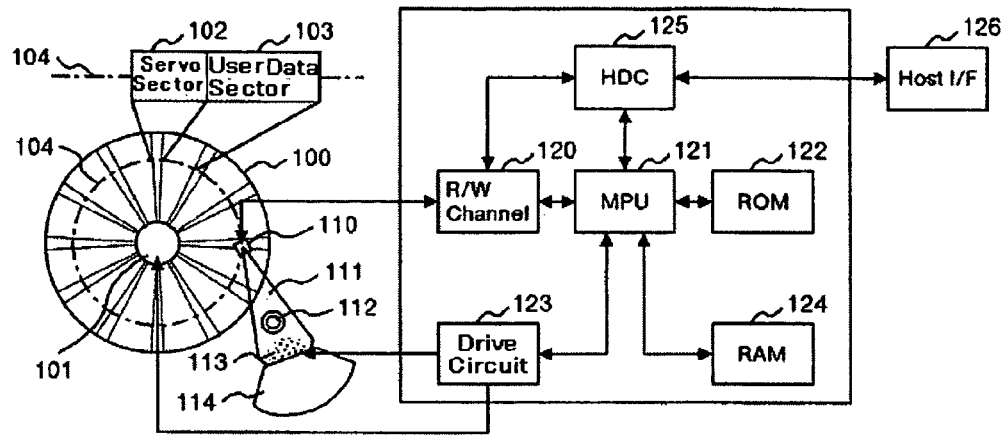
FIG. 1 shows the configuration of a magnetic disk drive according to an embodiment of the present invention.

FIG. 1 is a diagram showing the configuration of a magnetic disk drive according to an embodiment of the present invention. A spindle motor 101 bears one or a plurality of magnetic disks 100 and rotates at a fixed speed. A magnetic head 110 is mounted at the tip of an arm 111 for data read/write from/to a magnetic disk 100. The arm 111 is pivotally moved around a pivot axis 112. The power to move the arm 111 is obtained by energizing the coil 113 of a voice coil motor (VCM) 114. Servo sectors 102 which contain servo information are provided intermittently along a large number of concentric tracks 104 on the magnetic disk 100. Each servo sector is sandwiched between user data sectors 103. The magnetic head 110 is located to a desired track by the arm 111 which pivots based on the servo information.

A read/write channel 120 is a circuit for writing and reading data to and from the magnetic disk 100. A drive circuit 123 includes drivers and their peripherals for the VCM 114 and spindle motor 101. A microprocessor (MPU) 121 is one of the ways for implementing a controller. The position error or the distance between the magnetic head position and a desired track is decoded by the read/write channel 120 and entered into the MPU 121. The controller output (operation value) of the MPU 121 is calculated thereby so that the position error is reduced to zero. By the drive circuit 123, a current is generated based on the operation value and applied to the coil 113. The MPU 121 also performs general control of the magnetic disk drive and the programs and various parameters needed to operate it are stored in a ROM 122 and a RAM 124. A hard disk controller 125 controls data transfers to and from a host system via a host interface 126.

Figure 2:
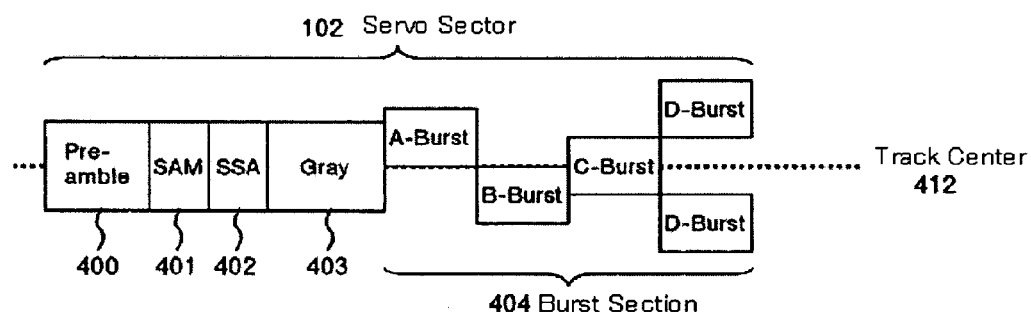
FIG. 2 shows the format of the servo sector in the magnetic disk drive according to the embodiment of the present invention.

FIG. 2 depicts the format of the servo sector 102. The sector 102 is written during servo track write as a reference position signal and contains positioning information needed for the servo control. Typically, the servo sector 102 includes an automatic gain control (AGC) section 400, a servo address mark (SAM) section 401, a servo sector number (SSA) section 402, a gray code track section 403 and a burst section 404. The magnetic head 110 generates a reference signal for the other sections in the AGC section 400, detects the position of the servo sector in the SAM section 401, detects the servo sector number in the SSA section 402, roughly detects the track position in the gray code track section 403 and detects precise position information in the burst section 404.

This magnetic disk drive of the embodiment is characterized by the SSA section 402. As an example for describing this embodiment, assume that each servo sector 102 has three bits (k=3) of servo sector number information and the servo sector number is determined by using servo sector information in two successive servo sectors 102 (m=2). As such, the maximum number of servo sectors which can be represented is $126=m(2^{m \times k}-1)$.

Figure 3:
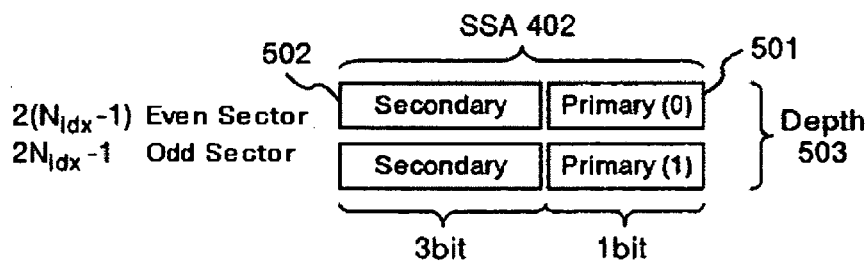
FIG. 3 shows the format of the servo sector number section shown in FIG. 2.

FIG. 3 shows the format of the SSA section 402 in this example. The SSA section contains two fields. One is a Primary pattern 501 (primary servo sector number information) indicating which one of m different servo sector number determinators is to be used whereas the other is a Secondary pattern 502 (secondary servo sector number information) suggesting a servo sector number.

In this example, the Primary pattern 501 consists of one bit whereas the Secondary pattern 502 consists of three bits (k=3). For example, the Primary pattern 501 may be the remainder resulting from dividing the servo sector number of the concerned servo sector by m. Accordingly, 1 is set if the servo sector number is odd whereas 0 is set if the number is even. The number m of servo sector number determinator types which a servo sector number determination device has is referred to as Depth 503. In this example, Depth 503 is 2. The Secondary pattern 502 is constructed based on base number Nidx.

Base number Nidx (0, 1, 2 . . . ) is dependent on the servo sector number of the concerned servo sector. In this example, if the servo sector number is odd, the servo sector number is 2Nidx−1, whereas if the number is even, the servo sector number is 2(Nidx−1). Not limited to this, however, the base number Nidx–servo sector number relation allows flexible representation. For example, if Depth 503 is 2, odd and even servo sector numbers may respectively be 2Nidx+1 and 2Nidx (Nidx=0, 1, 2 . . . ).

Figure 4:
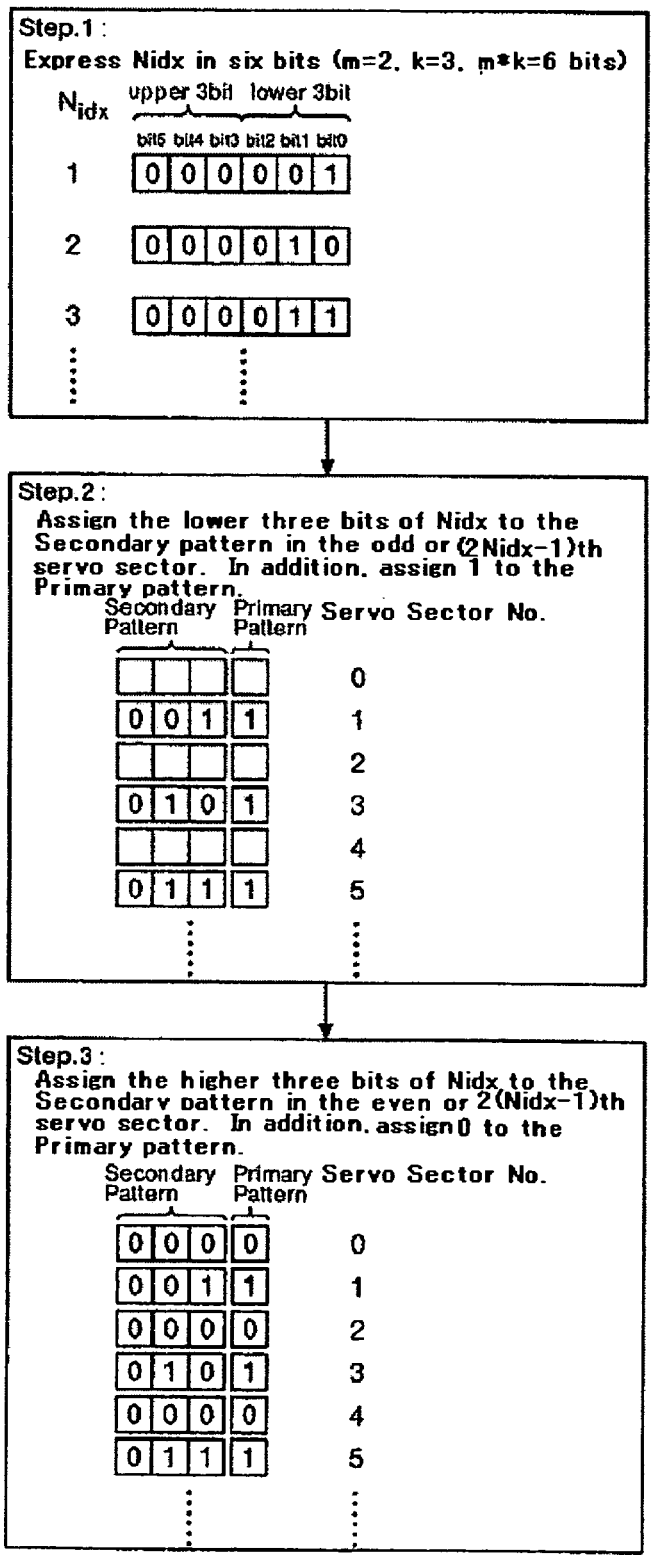
FIG. 4 shows an example of a procedure for generating the servo sector number section of FIG. 2.

FIG. 4 shows how servo sector number (SSA) sections 402 are generated. In Step 1, Nidx is expressed as a binary number of m×k bits in length, here 6 bits. In Step 2, if the servo sector number is odd or 2Nidx−1, the lower three bits of the Nidx is assigned to the Secondary pattern 502. In addition, the Primary pattern 501 is set to 1. In Step 3, if the servo sector number is of a servo sector preceding a servo sector whose servo sector number is odd or 2Nidx−1, that is, the servo sector number is even or 2(Nidx−1), the higher three bits of the Nidx is assigned to the Secondary pattern 502. In addition, the Primary pattern is set to 0 as well.

During servo track write, the format of SSA sections 402 can be generated by such a simple algorithm as shown in FIG. 4. In the example of FIG. 4, the Secondary pattern 502 or servo sector number information in each servo sector is 3 bits in length (k=3) and two successive servo sectors are used (m=2). In an example of FIG. 5, this algorithm is shown generically.

Figure 5:
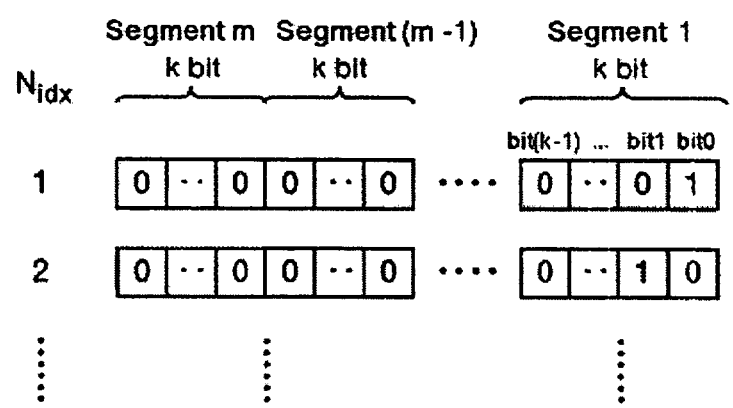
FIG. 5 shows another example of a procedure for generating the servo sector section of FIG. 2.
Figure 5:
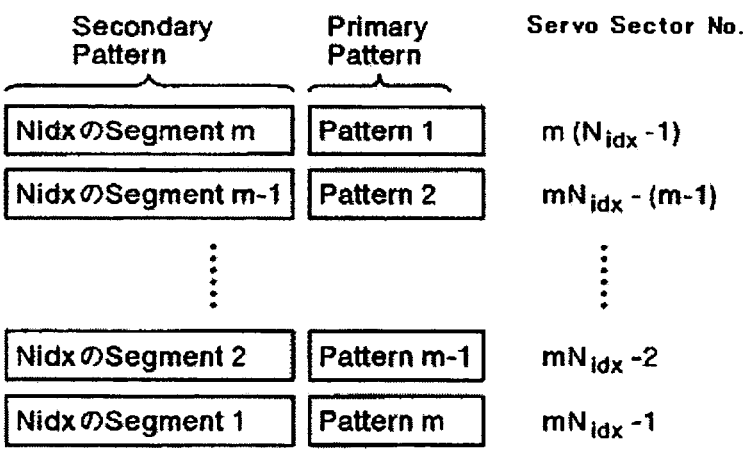

FIG. 5 shows how SSA sections 402 are generated when servo sector number information is k bits in length and m successive servo sectors are used. In Step 1, Nidx is expressed as a binary number of m×k bits in length. Then, Nidx is divided into m segments of k bits each. In Step 2, the segments are distributed among the Secondary patterns 502 depending on the remainder resulting from dividing the concerned servo sector number by m. In this example, if the concerned servo sector number causes a remainder j, segment m−j is assigned to the Secondary pattern 502. Not limited to this scheme, however, the segments can be distributed flexibly as far as base number Nidx is appropriately distributed to the SSA sections 402 of the respective servo sectors. To each Primary pattern 501, one of m different patterns is appropriately assigned according to, for example, the remainder resulting from dividing the concerned servo sector number by m.

Figure 6:
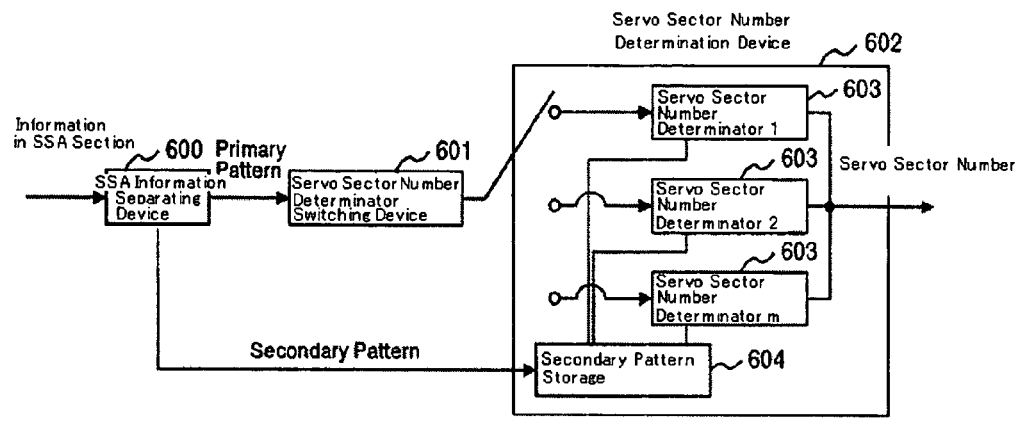
FIG. 6 shows the configuration of servo sector number determination device in the magnetic disk drive according to the embodiment of the present invention.

Then, it is described how a servo sector number is determined from the servo sector information written as described above. FIG. 6 shows a servo sector number determination device 602 according to an embodiment of the present invention. Information in a SSA section 401, decoded by the read/write channel 102, is separated into a Primary pattern 501 and a Secondary pattern 502 by SSA information separator 600. According to the Primary pattern 501, a servo sector number determinator switching device 601 decides or selects which one of m different servo sector number determinators 603 is to be used. The servo sector number determination device 602 comprises Secondary pattern storage 604 and m different servo sector number determinators 603. The separated Secondary pattern 502 is stored in the Secondary pattern storage 604. The Secondary pattern storage 604 stores the Primary patterns 501 of m successive servo sectors as well. Each servo sector number determinator 603 determines a servo sector number based on the Secondary patterns 502 of m successive servo sectors present in the Secondary pattern storage 604.

Figure 7:
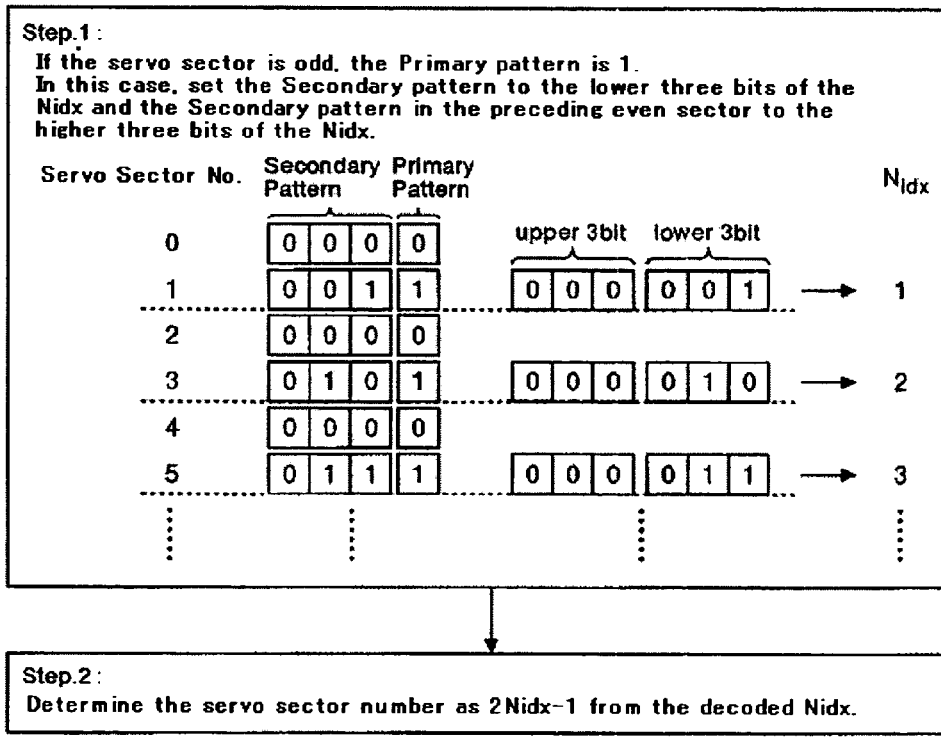
FIG. 7 shows how an odd servo sector is identified by the servo sector number determination device in the magnetic disk drive according to the embodiment of the present invention.

FIG. 7 shows how a servo sector number is determined when the servo sector number is odd. If the servo sector number is odd, the Primary pattern 501 in the SSA section 402 is 1. Based on this information, the servo sector number determinator 603 for odd servo sector numbers is selected. In Step 1 of FIG. 7, the Secondary pattern 502 in the concerned odd servo sector is set as the lower three bits of the base number Nidx and the Secondary pattern 502 in the preceding even servo sector present in the Secondary pattern storage 604 is set as the higher three bits of the base number Nidx. As such, the base number Nidx is synthesized and decoded as six bits of information. In Step 2, the servo sector number is determined as (2Nidx−1) from the decoded base number Nidx.

FIG. 8 shows how a servo sector number is determined when the servo sector number is even. If the servo sector number is even, the Primary pattern 501 in the SSA section 402 is 0. Based on this information, the servo sector number determinator 603 for even servo sector numbers is selected. In Step 1 of FIG. 8, the Secondary pattern 502 in the concerned servo sector is set as the higher three bits of the base number Nidx and the Secondary pattern 502 in the preceding odd servo sector present in the Secondary pattern storage 604 is set as the lower three bits of the base number Nidx. Further, if the lower three bits are 111, they are corrected to 000. Otherwise, 1 is added to the lower three bits. In Step 2, the servo sector number is obtained as 2(Nidx−1) from the decoded base number Nidx.

While it is assumed in the above description that the servo sector number information in each servo sector is three bits in length (k=3) and two successive servo sectors are used (m=2), the servo sector number information may be arbitrary in length and an arbitrary number of successive servo sectors may be used. Assume that the servo sector information is k bits in length and m successive sectors are used. In this case, a k-bit servo sector number information segment is recorded in each of m successive sectors. The base number Nidx can be decoded as well by appropriately rearranging the segments and correcting the result. Then, by using the decoded base number Nidx, the servo sector number can be determined by such a simple formula as mentioned above.

However, enlarging the Depth 503 (m) increases the determination algorithms although this shortens the bit length k of the servo sector number information, i.e., reduces the information's share of the servo format. It is therefore necessary to consider a trade-off between them. Also note that the servo sector number determination device 602 may be implemented either by software for the MPU 121 or by dedicated hardware.

Only a single embodiment of the present invention has been described. The present invention is not limited to the servo format and servo sector determination device which are specific to this embodiment. In addition, while the Primary pattern is used in this embodiment to select a servo sector number determinator, it is alternatively possible to select a servo sector number determinator based on the SAM pattern, one of m different SAM patterns defined. It is also possible to modify the configuration in such a manner that the Primary patterns in m successive servo sectors are used to generate a new pattern and a servo sector number determinator is selected based on its pattern matching. Further, it is also possible to modify the configuration in such a manner that an index mark is embedded in one servo sector on each track, the servo sectors are counted starting from the index mark and a servo sector number determinator is selected based on the remainder resulting from dividing the count by the Depth (m).

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive comprising:
   a magnetic disk having a plurality of concentric tracks on each of which N servo sectors containing servo information are disposed alternately with data sections;
   a spindle motor which bears and rotates the magnetic disk;
   a magnetic head which writes and reads data to and from the magnetic disk;
   means for moving the magnetic head in a radial direction of the magnetic disk; and
   a decoding circuit which decodes the servo information read by the magnetic head;
   wherein each servo sector has a servo sector number section where k bits of servo sector number information, fewer than the bits required to express the servo sector number itself, are written; and
   wherein said magnetic disk drive further comprises:
   storage means for storing the k-bit servo sector number information which has been read from each of m successive servo sectors and decoded by the decoding circuit;
   m different servo sector number determinators which determines the servo sector numbers of servo sectors from the m pieces of k-bit servo sector number information (where, $m(2^{m \times k}-1) \leq N$); and
   selecting means for selecting one of the m different servo sector number determinators.

2. A magnetic disk drive according to claim 1, wherein said m is 2 and, the selecting means selects one of two different servo sector number determinators depending on whether the servo sector is odd or even.

3. A magnetic disk drive according to claim 1, wherein each servo sector has a servo address mark section where one of m different servo address marks is written and, the selecting means selects one of the m different servo sector number determinators depending on the servo address mark in the servo sector.

4. A magnetic disk drive according to claim 1, wherein each servo sector has an index section where an index may be written to indicate the start of the track, and the selecting means counts the servo sectors starting from the index for selecting one of the m servo sector number determinators depending on the counted value.

5. A magnetic disk drive comprising:
a magnetic disk having a plurality of concentric tracks on each of which N servo sectors containing servo information are disposed alternately with data sections;
a spindle motor which bears and rotates the magnetic disk;
a magnetic head which writes and reads data to and from the magnetic disk;
means for moving the magnetic head in a radial direction of the magnetic disk; and
a decoding circuit which decodes the servo information read by the magnetic head;
wherein each servo sector has a servo sector number section where j bits of primary servo sector number information and k bits of secondary servo sector number information, fewer than the bits required to express the servo sector number itself, are written; and
wherein said magnetic disk drive further comprises:
storage means for storing the secondary servo sector number information which has been read from each of m successive servo sectors and decoded by the decoding circuit;
m different servo sector number determinators which determine the servo sector numbers of servo sectors from the m pieces of secondary servo sector number information (where, $m(2^{m \times k}-1) \leq N, j \neq 0$); and
selecting means for selecting one of the m different servo sector number determinators depending on the primary servo sector number information.

6. A magnetic disk drive comprising:
a magnetic disk having a plurality of concentric tracks on each of which N servo sectors containing servo information are disposed alternately with data sections;
a spindle motor which bears and rotates the magnetic disk;
a magnetic head which writes and reads data to and from the magnetic disk;
a mechanism configured to move the magnetic head in a radial direction of the magnetic disk; and
a decoding circuit which decodes the servo information read by the magnetic head;
wherein each servo sector has a servo sector number section where k bits of servo sector number information, fewer than the bits required to express the servo sector number itself, are written; and
wherein said magnetic disk drive further comprises:
a storage configured to store the k-bit servo sector number information which has been read from each of m successive servo sectors and decoded by the decoding circuit;
m different servo sector number determinators which determines the servo sector numbers of servo sectors from the m pieces of k-bit servo sector number information (where, $m(2^{m \times k}-1) \leq N$); and
a servo sector number determinator switching device configured to select one of the m different servo sector number determinators.

7. A magnetic disk drive according to claim 6, wherein said m is 2 and, the servo sector number determinator switching device selects one of two different servo sector number determinators depending on whether the servo sector is odd or even.

8. A magnetic disk drive according to claim 6, wherein each servo sector has a servo address mark section where one of m different servo address marks is written and, the servo sector number determinator switching device selects one of the m different servo sector number determinators depending on the servo address mark in the servo sector.

9. A magnetic disk drive according to claim 6, wherein each servo sector has an index section where an index may be written to indicate the start of the track, and the servo sector number determinator switching device counts the servo sectors starting from the index for selecting one of the m servo sector number determinators depending on the counted value.

* * * * *